(12) United States Patent
Crafton et al.

(10) Patent No.: US 6,298,808 B1
(45) Date of Patent: Oct. 9, 2001

(54) ANIMAL PRIVACY SYSTEM

(76) Inventors: Lynnette Crafton, 920 Tyler Ave., Apt. 5A, Dyer, IN (US) 46311; Gloria Ullstam-Trevino, 10138 Windfield Dr., Munster, IN (US) 46321

( * ) Notice: Subject to any disclaimer, the term of this patent is extended or adjusted under 35 U.S.C. 154(b) by 0 days.

(21) Appl. No.: 09/449,383

(22) Filed: Nov. 24, 1999

(51) Int. Cl.[7] .................................................. A01K 1/035
(52) U.S. Cl. ........................................... 119/165; 119/496
(58) Field of Search .................................. 119/165, 170, 119/482, 484, 496, 497, 706

(56) References Cited

U.S. PATENT DOCUMENTS

| | | |
|---|---|---|
| 3,087,458 | 4/1963 | Bennett . |
| 4,029,048 * | 6/1977 | Gershbein ........................ 119/484 X |
| 4,301,766 * | 11/1981 | Piccone ................................ 119/482 |
| 4,348,982 | 9/1982 | Selby . |
| 4,590,885 | 5/1986 | Sugiura . |
| 4,760,816 | 8/1988 | Rhodes . |
| 4,966,097 * | 10/1990 | Rosenberger .................... 119/455 X |
| 5,012,765 | 5/1991 | Naso et al. . |
| 5,092,277 | 3/1992 | Baillie et al. . |
| 5,148,767 * | 9/1992 | Torchio ............................... 119/484 |
| 5,471,950 * | 12/1995 | White ................................. 119/497 |

OTHER PUBLICATIONS

Bernadzikowski, Susan M., Box It Up, Source Unknown found at Internet site <<http:\\www.search.inspire–indiana.net>> Search: kw(litter box).

Fresh Litter, Cat's Magazine, May 98, vol. 54, p51, 6p, 4c.

Great Gadgets and Gizmos, Woman's Day, Nov. 1, 1994, vol. 57 Issue 17, p 33, 1/3p, 1c.

Motaalli, Jim, Every Litter Bit Hurts, E Magazine: The Environmental Magazine, Jul./Aug. 96, vol. 7 Issue 4, p51, 2/5p, 1c.

Associated Press, High–Tech Litter Sweeper Cat's Meow of Pet Potties, Business First—Columbus, Dec. 5, 1997, vol. 14 Issue 15, p21, 1/9p.

Marder, Amy, V.M.D., Barnish Litter Box Woes: How To Maintain a Litter Box Your Cat Will Love to Use, Animals, Nov./Dec. 98, vol. 131 Issue 6, p20, 2p.

Cheever, Holly, Beating Litter–Box Blues, Good Housekeeping, Sep. 98, vol. 227 Issue 3, p163, 3/4p, 2bw.

Marder Amy, V.M.D., Litter–Box "Nonscents", Prevention, Jan. 93, vol. 45 Issue 1, p97, 3p.

Sanitation for Cats, Doctors Foster & Smith, vol. 98 Issue 22, p114, 115.

Rizzo, Holly O., Cat Newsline, Cat Fancy, Mar. 1999, p6.

Photocopy of product package for "Kitty Komplete", Mar. 22, 1999.

Advertisement for "Litter Maid", Date and Location Unknown.

Advertisement for "Purr–fect Privy", Date and Location Unknown.

Advertisement for "Litter Gitter", Target Sales Flyer, Mar. 1999.

* cited by examiner

Primary Examiner—Robert P. Swiatek
(74) Attorney, Agent, or Firm—Marshall, Gerstein & Borun

(57) ABSTRACT

An animal privacy system that includes a module having a stackable frame, a cantilevered platform and/or fasteners. Each module has an opening to allow access into its interior space. Litter boxes may be disposed inside of the individual modules. The modules may be stacked one on top of the other, and may be fastened to one another such that there is limited movement between the modules in the vertical direction. When the modules are stacked in this manner, multiple litter boxes may be accommodated in the same amount of floorspace as one litter box. Additionally, the animal privacy system may include a litter guard inside of the module that works to reduce the amount of litter that is thrown from the litter box, thereby simplifying the cleaning process.

20 Claims, 9 Drawing Sheets

ANIMAL PRIVACY SYSTEM

FIELD OF THE INVENTION

This invention relates to an animal privacy system having stackable modules, and in particular, an animal privacy system having stackable modules configured as litter boxes.

BACKGROUND OF THE INVENTION

As many cat owners can attest, cats can be finicky when it comes to litter boxes and litter box behavior. For example, it is not uncommon for one cat to use one litter box for urine excretion and another for solid waste excretion. Moreover, many cats tend to be very private about their litter boxes. Some cats will not use a litter box if it has been used by another cat.

As a consequence, in many households with cats, it is not uncommon to see multiple litter boxes in use. In fact, in households with multiple cats, the floor space of an entire wall of a room may be covered with litter boxes. In addition to the obvious problem of cleaning such a room, the pet owners are also inconvenienced by the loss of living space created by the multiple litter boxes.

It is known in the prior art to deal with the aforementioned cleaning problems by utilizing disposable litter boxes wherein the entire litter box, after it has been used, is thrown away, as in U.S. Pat. No. 4,760,816, issued to Rhodes. Alternatively, it is also known to prevent dispersion of the litter through the use of a litter box wherein the cat must meander through a bi-level maze-like structure, wherein the floor is made of a mesh screen allowing litter that is stuck in the cat's paws to fall through back to the litter box, as in U.S. Pat. No. 5,092,277, issued to Baillie et al.

These disclosures assist cat owners in alleviating the cleaning problems associated with cleaning litter boxes. However, they do not address the problem of the loss of living space caused by having multiple litter boxes. Owners of multiple cats will still have to utilize the floor space of an entire wall of one room to accommodate the multiple litter boxes.

Although not a part of this particular field, it is known in other settings to stack cages for use in housing many animals. For example, U.S. Pat. No. 3,087,458 issued to Bennett, Jr. describes interlocking cages. While it is possible to include solid waste removal systems with such cages, they are not practical for home use. Such cages are typically found in pet stores, animal hospitals and the like. The sheer size of the cage units make them impractical for use in the typical household.

It is therefore an object of the invention to provide a containment system for multiple litter boxes that saves floor space.

It is another object of the invention to appeal to the natural affinity of cats to high places.

It is further an object of the invention to minimize the dispersion of cat litter that is scattered when the cat uses the litter box.

SUMMARY OF THE INVENTION

The animal privacy system of this invention includes a stackable module, including a frame, a cantilevered platform with a first end attached to the frame and a second free end that extends away from the frame and/or a fastener to attach the modules to one another. Each module includes an opening to allow for access by a cat into the interior of the module. The modules may be stacked one on top of the other and then fastened together in a manner that prevents vertical motion between the modules.

BRIEF DESCRIPTION OF THE EMBODIMENTS

These and other features of the present invention will be more clearly understood from a consideration of the following description taken in connection with the accompanying drawings, in which.

DETAILED DESCRIPTION OF THE EMBODIMENTS

Figure 1:
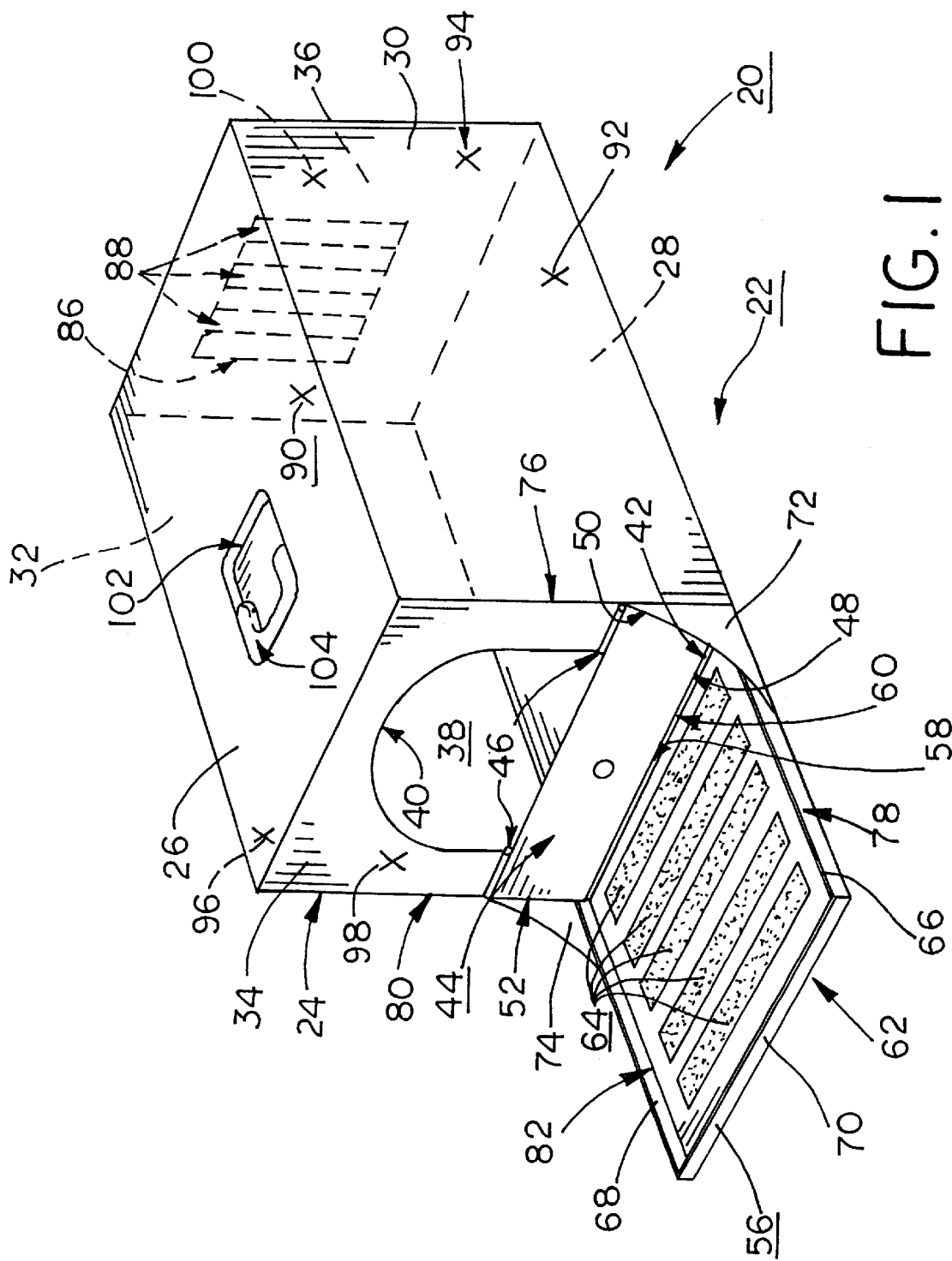
FIG. 1 is a perspective view of a module according to an embodiment of the present invention.
Figure 2:
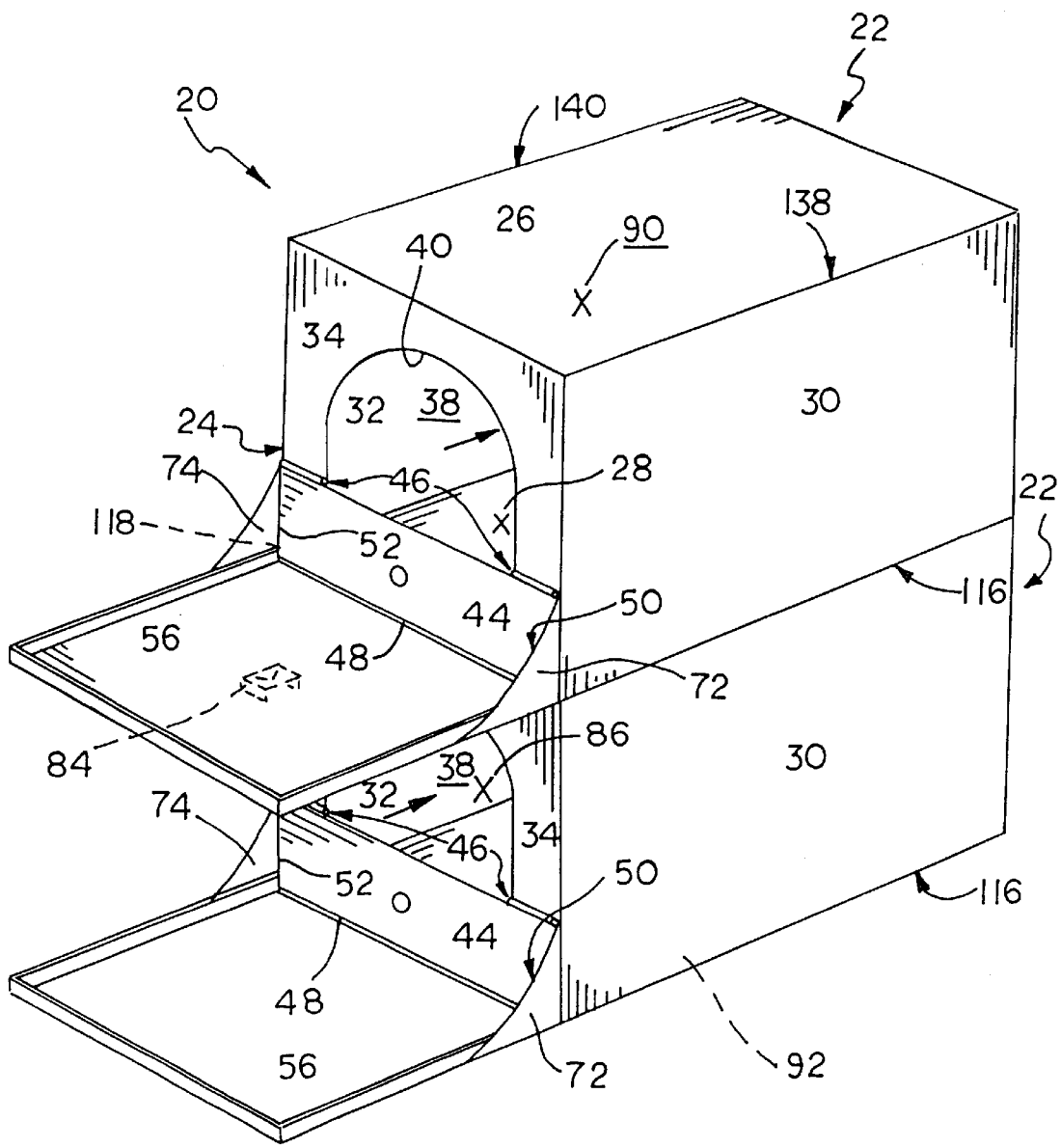
FIG. 2 is a perspective view of two modules according to FIG. 1 stacked vertically one on top of the other.

Referring to FIG. 1, an animal privacy system 20 according to an embodiment of the invention includes at least one animal privacy module 22. As shown in FIG. 2, the modules 22 of the system 20 may be stacked vertically one on top of the other to define a vertically-oriented structure having a footprint of a single module 22.

Returning to FIG. 1, the embodiment of the module 22 has a rectangular parallelepiped frame 24 with opposing top and bottom, right and left, front and back walls, 26, 28, 30, 32, 34, 36 defining an interior space 38. The front wall 34 defines a first opening 40 therethrough which provides access to the interior space 38. The front wall 34 also defines a second opening 42 adjacent to the first opening 40.

A door 44 is attached to the front wall 34, and, in a closed state, covers the second opening 42. The door 44 may be hinged on the top edge 46. Alternatively, the door 44 may be hinged along its bottom edge 48, or the right or left edges 50, 52. The door 44 may be opened to allow a litter box 54 (see FIG. 9) to be inserted into the interior space 38.

The module 22 also includes a cantilevered platform 56. The cantilevered platform 56 has a first edge 58 which is attached to the bottom front edge 60 of the frame 24 of the module 22, and an unsupported, free end 62 which extends away from the frame 24 of the module 22. In a preferred embodiment, the cantilevered platform 56 is integrally attached to form a one piece structure with the frame 24 of the module 22. The cantilevered platform 56 serves as a landing to assist the animal to the next level. Textured strips 64 may be disposed on the cantilevered platform 56 to prevent an animal from slipping when using the cantilevered platform 56.

The cantilevered platform 56, has a right raised edge or lip 66, a left lip 68, and a front lip 70. The lips 66, 68, 70 serve to catch stray litter that may be thrown from the litter box 54 on to the platform 56.

To provide strength and stability to the cantilevered platform 56, the module 22 may also include right and left side supports 72, 74. The right side support 72 is attached to the right front edge 76 of the frame 24 of the module 22, and to the right edge 78 of the cantilevered platform 56. Similarly, the left side support 74 is attached to the left front edge 80 of the frame 24 of the module 22, and to the left front edge 82 of the cantilevered platform 56.

Additionally, the cantilevered platform 56 may be equipped with an attachment device 84 to attach hanging toys (see FIG. 2) to the module 22 to entice an animal to use the animal privacy system 20. These toys will appeal to the animals curiosity and draw them into the animal privacy system.

The back wall 36 of the frame 24 has an indentation which serves as a filter compartment 86. The filter compartment 86 may hold one or more standard odor absorbing filters 88.

The top and bottom, right and left, front and back walls 26, 28, 30, 32, 34, 36 that make up the animal privacy module 22 preferably have planar surfaces 90, 92, 94, 96, 98, 100. The top and bottom planar surfaces 90 and 92 allow the animal privacy modules 22 to be stacked as shown in FIG. 2. That is, the top planar surface 90 of the bottom module 22 is abutted against the bottom planar surface 92 of the top module 22.

To assist the owner in carrying the animal privacy module 22, a shallow indentation 102 with a handle 104 disposed therein is located in the top wall 26. In a first state, the handle 104 is folded into the shallow indentation 102 to maintain the planar surface 90. In a second state, the handle 104 can be raised into an operative position to allow the module 22 to be picked up by the handle 104. The use of the handle 104 allows the owner to move the animal privacy system 20 more easily. This, in turn, assists in cleaning by allowing the entire animal privacy system 20 to be more easily relocated near the trash receptacle.

Figure 3:
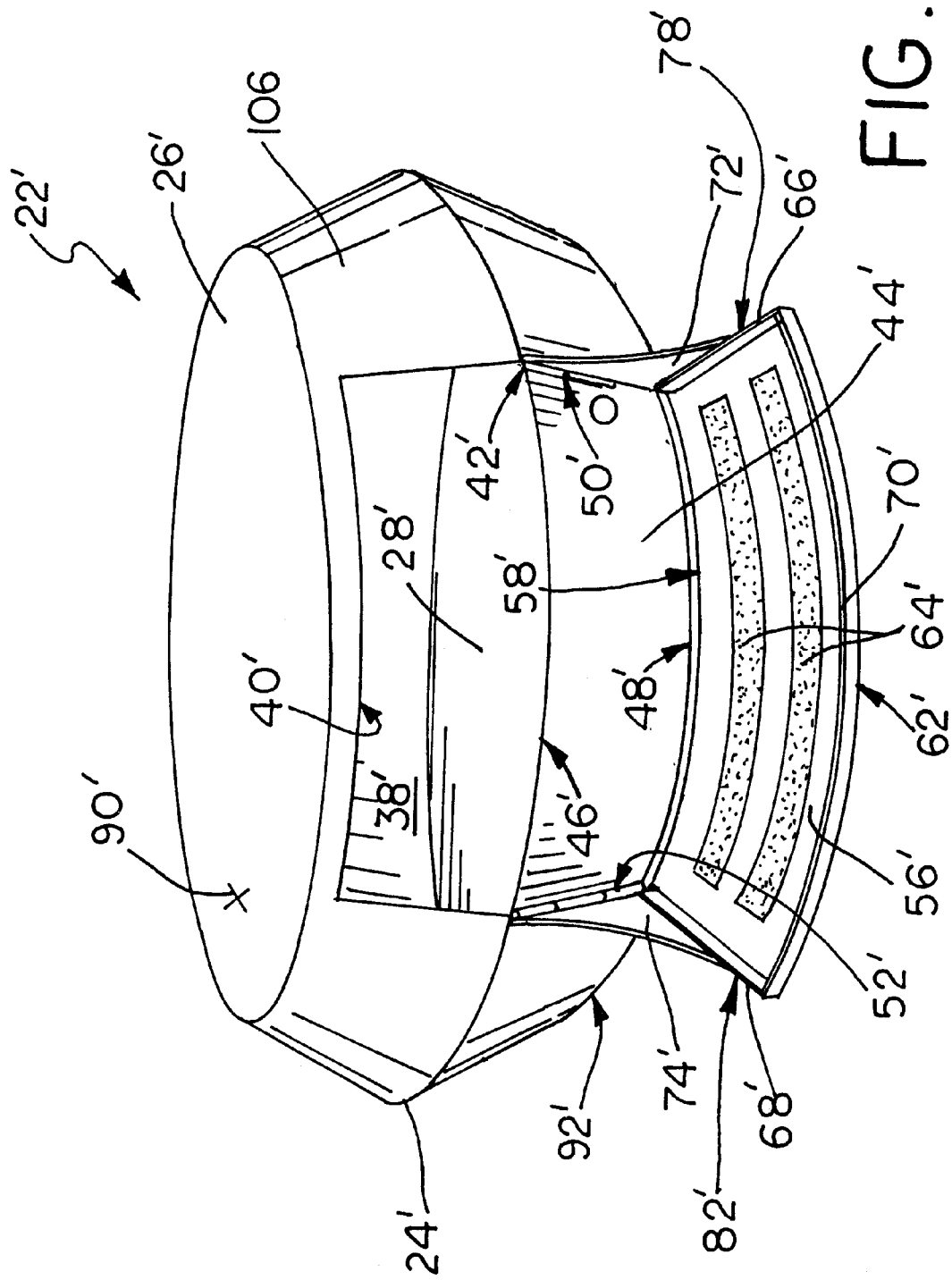
FIG. 3 is a perspective view of a module according to another embodiment of the present invention.

A further embodiment of the present invention is shown in FIG. 3. The embodiment of FIG. 3 differs from that shown in FIGS. 1 and 2 in that the shape of the module is cylindrical instead of parallelepiped. Otherwise, similar elements are numbered similarly with the addition of a prime.

The cylindrical embodiment of the animal privacy module 22' has a single substantially vertical wall 106. The wall 106 is attached to substantially horizontal top and bottom walls 26', 28', respectively. The walls 106, 26', 28' define an interior space 38'. Access to the interior space 38' is gained through a first opening 40' in the wall 106. As in the embodiments of FIGS. 1 and 2, a second opening 42' is adjacent the first opening 40' and is covered by a pivotally hingeable door 44' in a first state. As discussed above, the pivotally hingeable door 42' may hinge along any of its four edges 46', 48', 50' and 52'.

Similar to the embodiments in FIGS. 1 and 2, the top and bottom walls 26', 28' of the cylindrical embodiment in FIG. 3 include flat planar surfaces 90', 92'. These planar surfaces, 90' and 92', allow multiple units of the cylindrical embodiment to be stacked to multiple levels.

The cylindrical embodiment 22' also contains a cantilevered platform 56'. This cantilevered platform 56' has a first edge 58' which is attached to the base of the frame 24' of the module 22', and a second unsupported, free end 62' which extends away from the frame 24' of the animal privacy module 22'.

To provide support and stability to the cantilevered platform, the embodiment in FIG. 3 also includes right and left side supports 72', 74' respectively. The right side support 72' attaches along the wall 106 and to the right edge 78' of the cantilevered platform 56'. Similarly, the left side support 74' attaches along the wall 106 and the left edge 82' of the cantilevered platform 56'.

Figure 4:
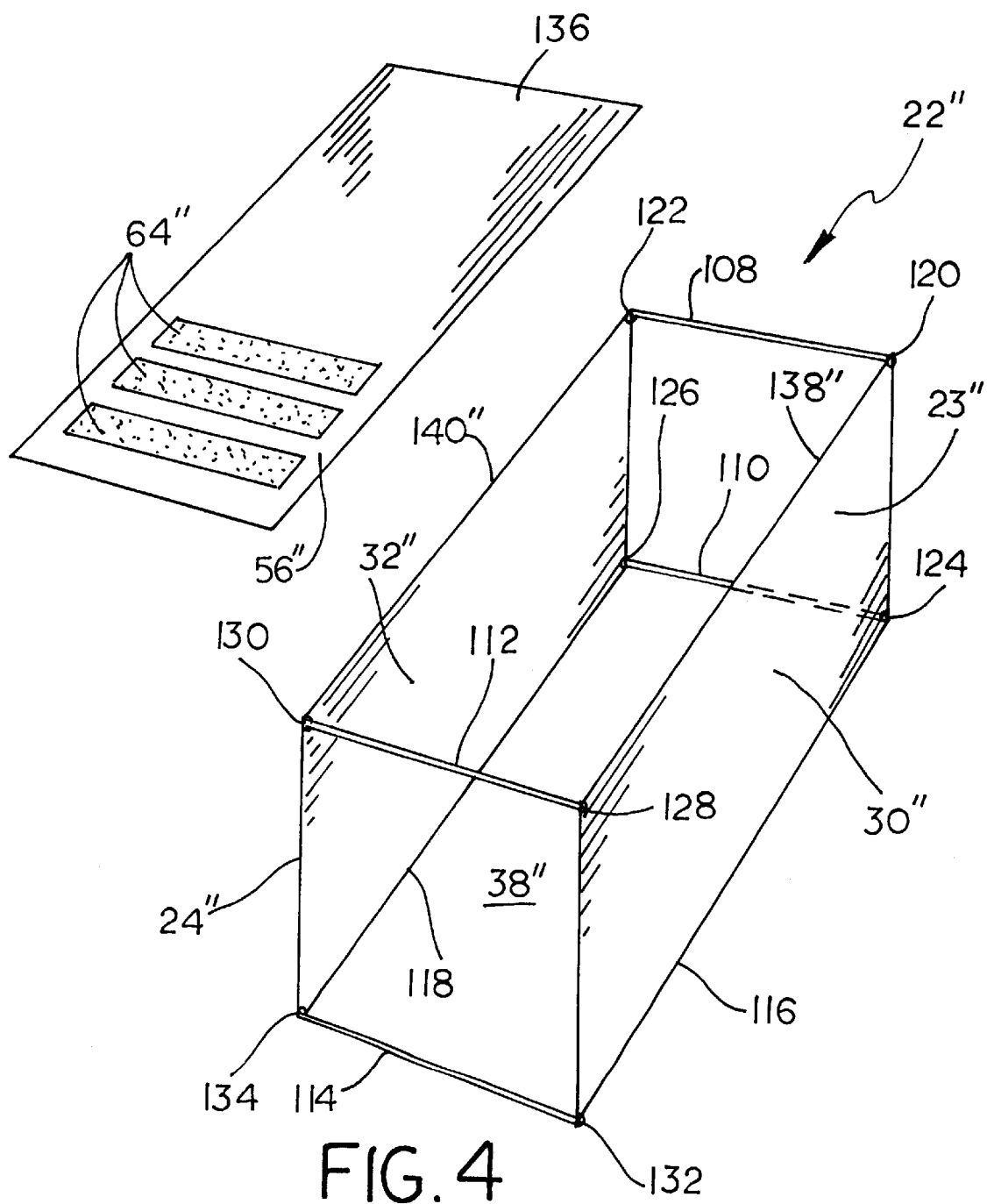
FIG. 4 is a perspective view of a module according to a further embodiment.

Yet another embodiment of the present invention is shown in FIG. 4. The embodiment of FIG. 4 is similar to that shown in FIGS. 1 and 2 in that the shape of the module is parallelepiped. However, the embodiment in FIG. 4 is made constructed with two walls and four rods. Otherwise, similar elements are numbered similarly with the addition of a double prime.

FIG. 4 shows a singular animal privacy module 22" wherein the frame 24" includes a right wall 30" and a left wall 32" which are held together by four rods 108, 110, 112, 114. The walls 30", 32" are rectangular in shape and stand along their long edges 116, 118. The four rods 108, 110, 112, 114 attach to the respective four corners of the two walls 30", 32". Thus, rod 108 attaches to the top back corners 120, 122 of walls 30", 32", rod 110 attaches to the bottom back corners 124, 126 of walls 30", 32", rod 112 attaches to the front top corners 128, 130 of walls 30", 32", and rod 114 attaches to the front bottom corners 132, 134 of walls 30", 32". The frame 24" formed by walls 30", 32" and rods 108, 110, 112, 114 defines an interior space 38".

This embodiment of a animal privacy module 22" also includes a separately attachable third wall 136. The wall 136 is attachable, for example, at the top four corners 120, 122, 128, 130 of walls 30", 32". Although not shown, in an alternative embodiment, the wall 136 may be slidably attached to the frame 24" through the use of grooves along the top edges 138", 140" of walls 30", 32". When the third wall 136 is attached the rectangular parallelepiped frame 24", the third wall 136 simultaneously acts as a ceiling for the module 22" and a floor for the module that is stacked on top. Removing the third wall 136 allows for the thorough cleaning of the interior space 38".

The length of the third wall 136 is slightly longer than the length of walls 30", 32". The excess length wall 136 will form the cantilevered platform 56" for the next module when that module is stacked on top of this first module.

Figure 5:
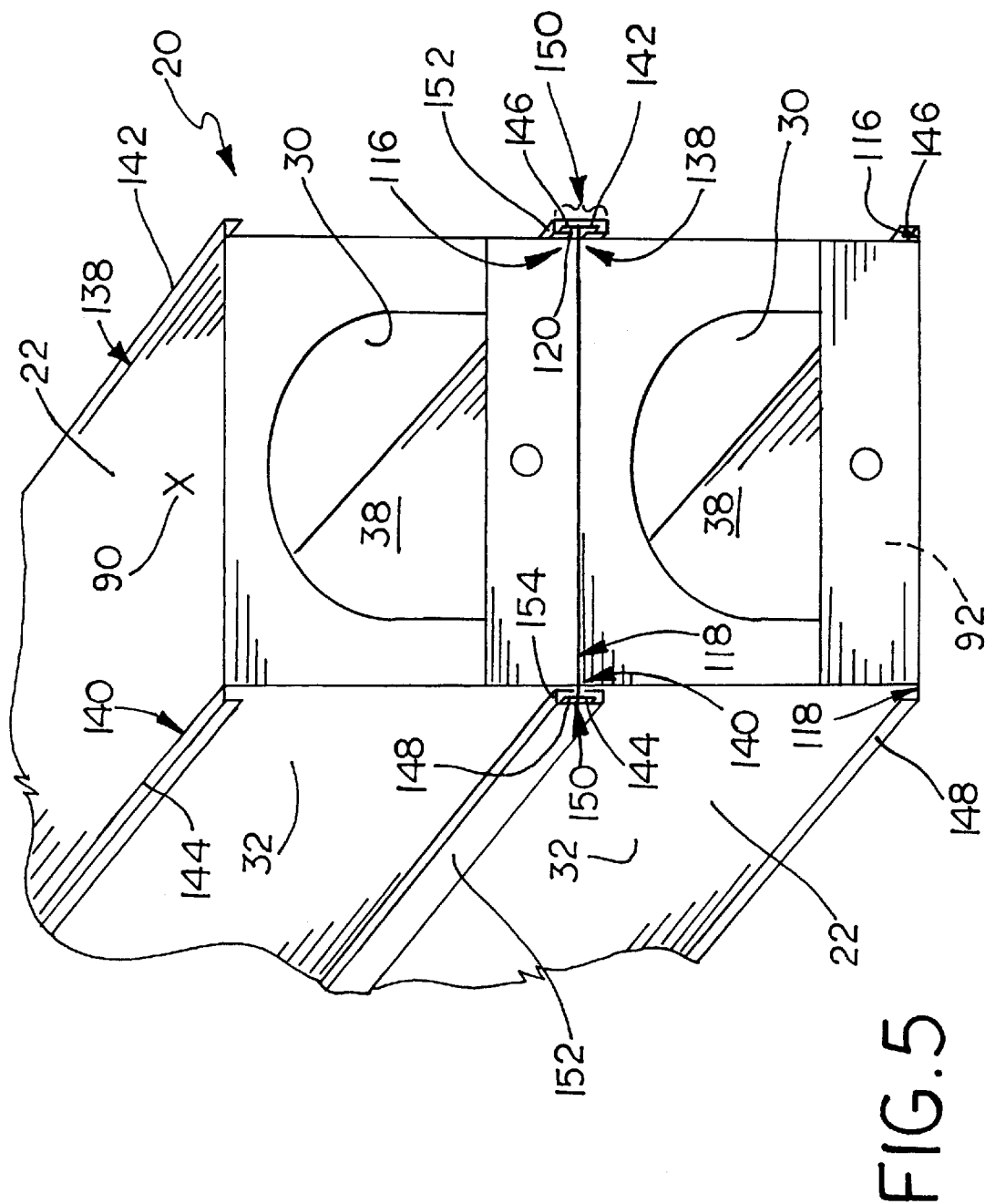
FIG. 5 is a perspective view of module according to a still further embodiment of the present invention, stacked vertically and attached with an embodiment of a fastener useful with a module according to the present invention.

Referring now to FIG. 5, in a preferred embodiment of the animal privacy system 20, two individual animal privacy modules 22 are stacked one on top of the other and secured together with fasteners. Each module 22 is equipped with L-shaped flanges 142, 144, 146, 148, which run along the edges 138, 140, 116, 118 of the modules 22. Specifically, the flange 142 runs along the top left edge 138, flange 144 runs along the right top edge 140, flange 146 runs along the bottom left edge 116, and flange 148 runs along the bottom right edge 118. The L-shaped flanges 142, 144 extend away from the walls 30, 32 and downward, while the L-shaped flanges 146, 148 extend away from the walls 30, 32 and upward.

Some of the L-shaped flanges 142, 146, 144, 148 abut one another with planar surface 92 of the top module 22 abutting the planar surface 90 of the bottom module 22. The abutting flanges 142, 146, 144, 148 define T-shaped fastener receiving structures 150. A fastener or clip 152 which has a T-shaped opening 154 is disposed along each T-shaped receiving structure 150 defined by the abutment of the two L-shaped flanges 142, 146 or 144, 148 to securely fasten the two modules 22 together, as shown.

Still other types of fasteners may be employed with the present invention.

Figure 6:
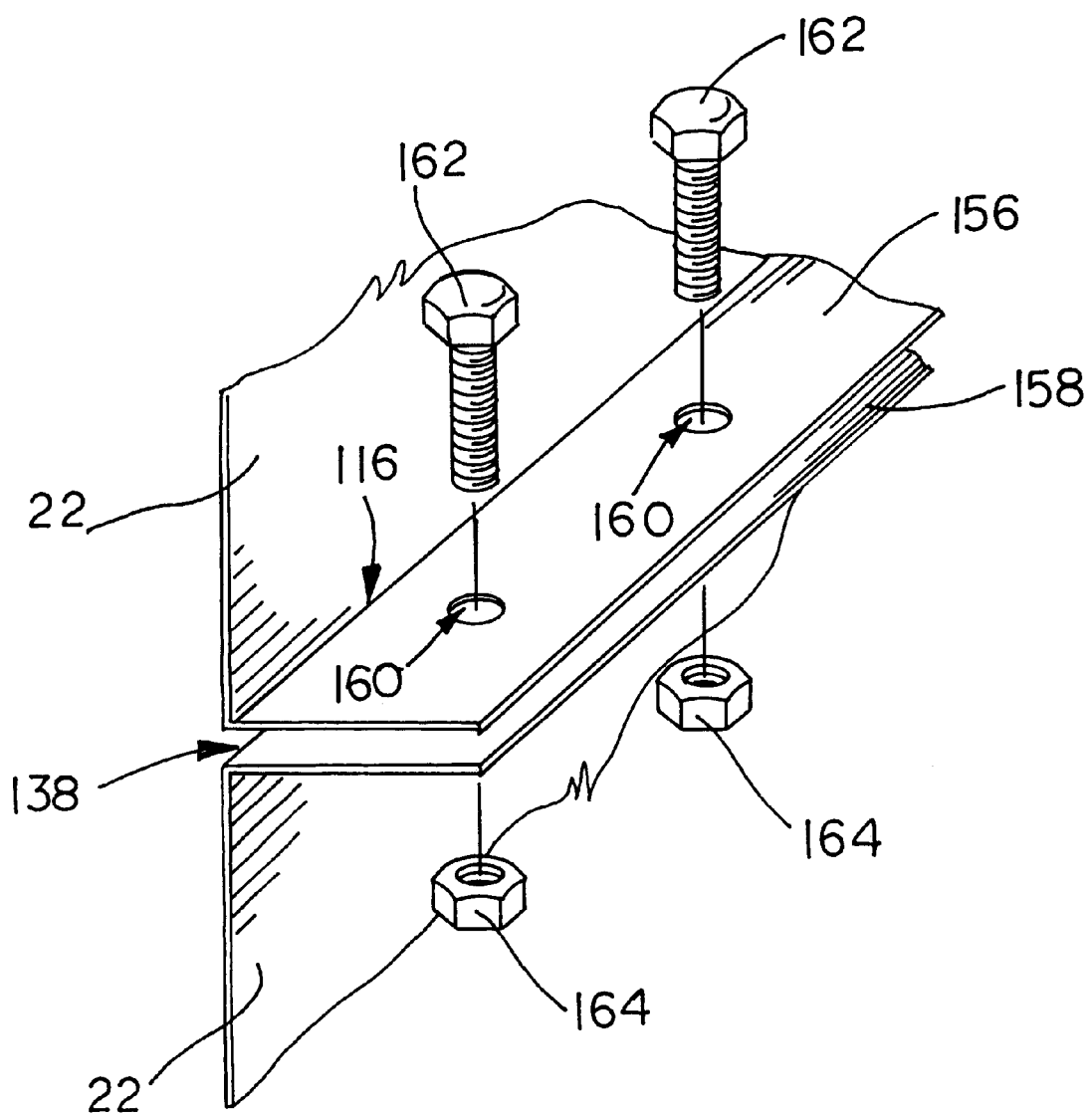
FIG. 6 is a partial, exploded view of another embodiment of a fastener useful with a module according to the present invention.

For example, FIG. 6 shows an enlarged exploded view of an alternative embodiment for a fastener useful with the present invention. In this embodiment, a flange 156 extends away from the bottom right edge 116 of the module 22 on top and a flange 158 extends away from the top right edge 138 of the module 22 on the bottom. At spaced intervals along the flanges 156, 158, holes 160 are formed therethrough. The holes 160 are suitable to receive a fastener or bolt 162 therethrough. Bolts 162 are disposed through the holes 160, and nuts 164 are screwably fastened on to the bolts 162 to secure the modules 22 together.

Figure 7:
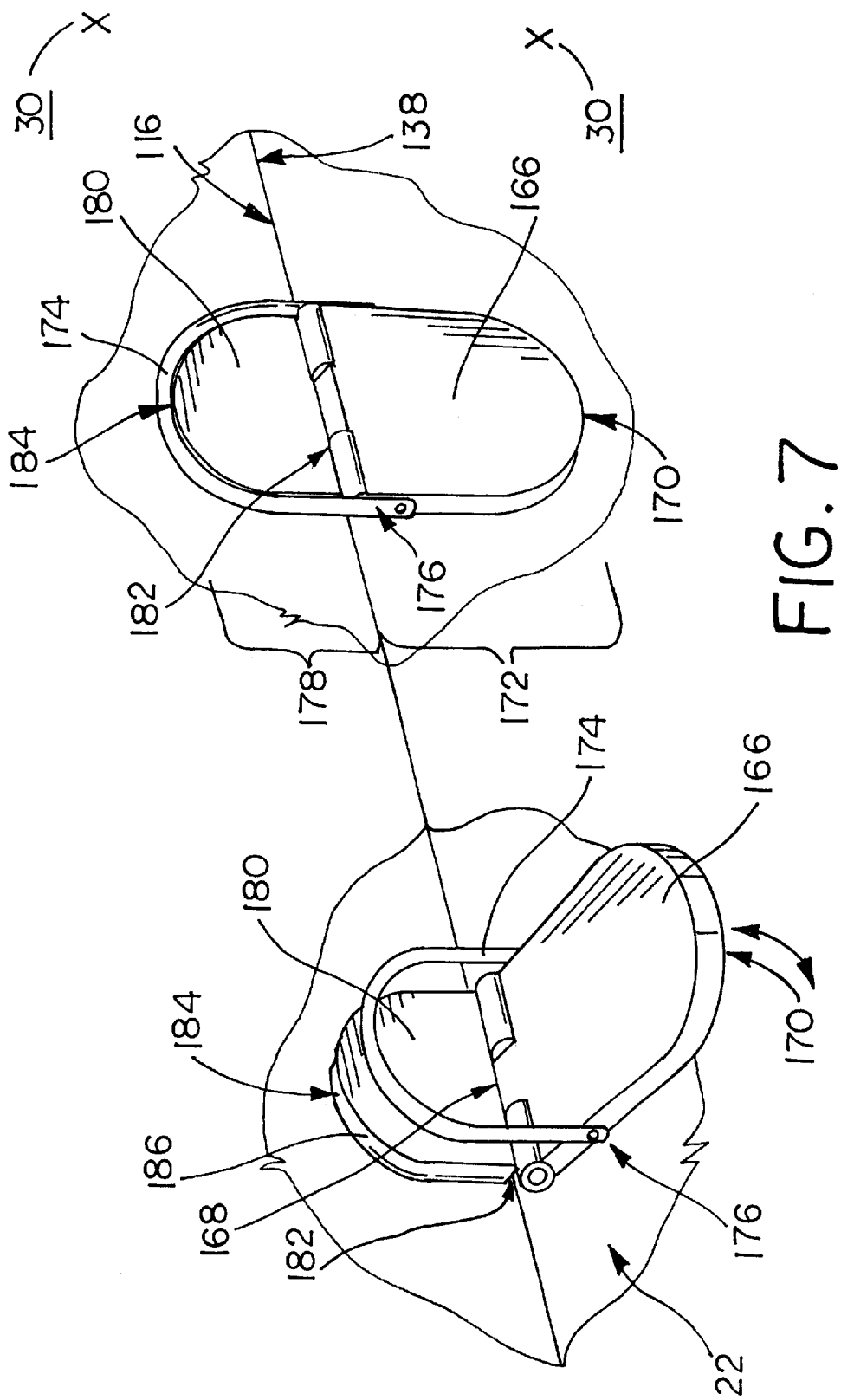
FIG. 7 is an enlarged, perspective view of a further embodiment of a fastener useful with a module according to the present invention.

FIG. 7 shows a still another fastener useful with the present invention. The fastener includes a pivotal tab 166 which is hingably attached, for example, to the bottom module 22. The tab 166 hinges along edge 168, and in a first position, the edge of the tab 170 rests against wall 30 at a predetermined distance 172 below edge 138. In a second position, the edge of the tab 170 can be raised such that the tab forms downward angle with wall 30. This embodiment also includes a pivotal, semi-circular ring 174 which is hingably attached to the tab 166 at a predetermined distance 176. The ring 174 rests in a first position against the module 22. In a second position, the ring 174 can be raised above the first position, so that touches wall 30 at a predetermined distance 178 above edge 116. The final element of this fastener is a fixed semi-circular tab 180. Tab 180 is attached to wall 30 with its bottom edge 182 abutting bottom edge 116 of wall 30. The top edge 184 of tab 180 is semi-circular in shape and has an arc that is similar to that of the semi-circular ring 174. The top edge 184 of tab 180 includes a groove 186.

To close this fastener, ring 174 is raised over the top of tab 180, and allowed to rest in the groove 186. Lifting the ring 174 to its second position, causes the bottom edge 170 of tab 166 to be raised into its second position. The two modules 22 are then secured together when the bottom edge 170 of tab 166 is pressed into its first position, resting against the module 22.

Others fasteners that can be used will be apparent to those skilled in the art.

Figure 8:
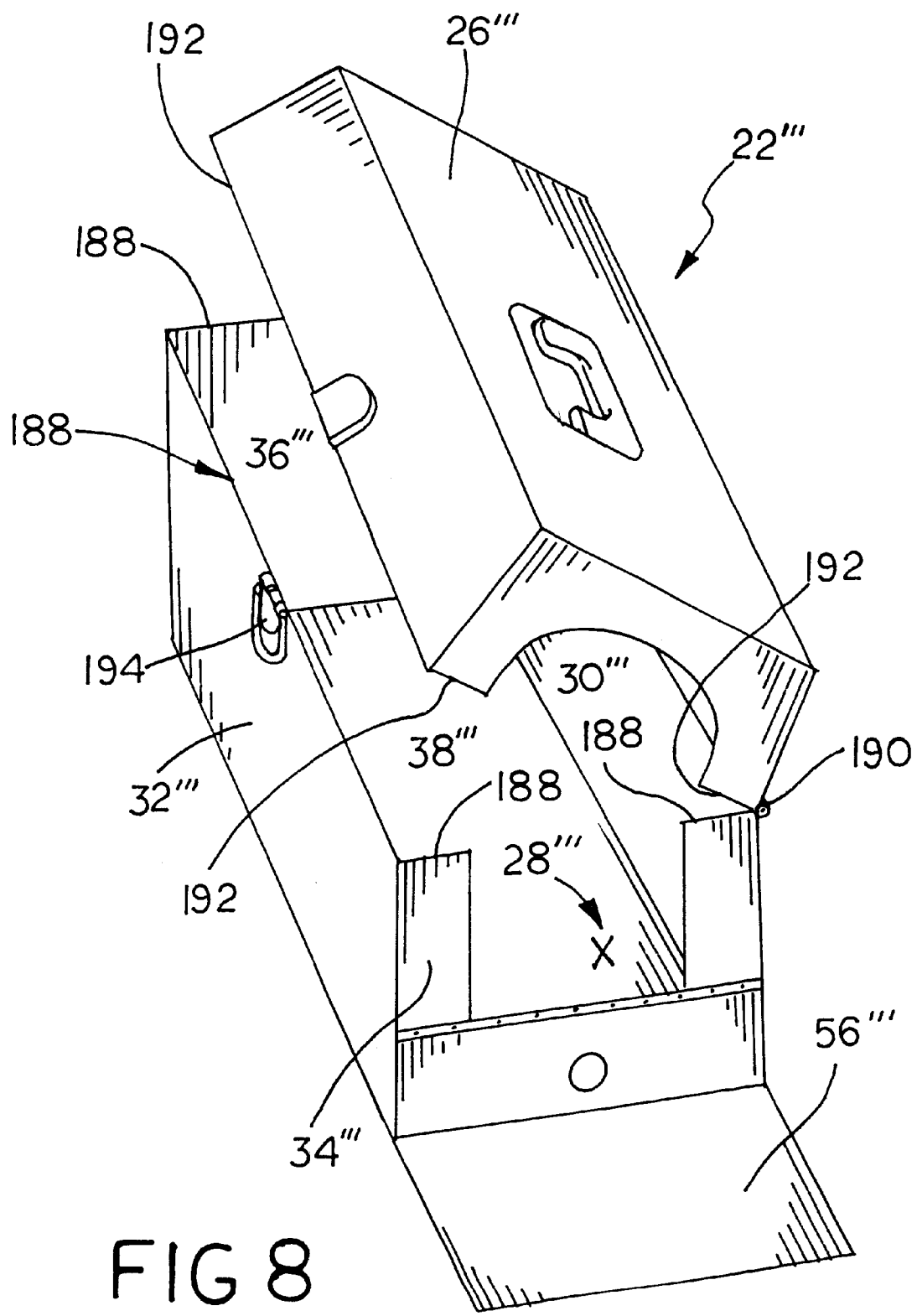
FIG. 8 is a perspective view of a module according to yet another embodiment of the present invention.

FIG. 8 shows yet another embodiment of the present invention. This embodiment differs from the previous embodiments in that it contains a hingable lid that allows for thorough cleaning of the invention. Otherwise, similar elements are numbered similarly with the addition of a triple prime.

In still a further embodiment, FIG. 8 shows an animal privacy module 22''' of FIG. 1. In this embodiment, the walls 30''', 32''', 34''', 36''' are split at a predetermined distance from the top along an edge 188, such that access to the interior space 38''' may be gained, as shown, by moving the top wall 26''' and the portions of side walls 30''', 32''', 34''', 36''' above edge 188 rotatably about a hinge 190 attached to the wall 30'''. Alternatively, hinge 190 may be disposed in the left wall 32''', or the front or back walls 34''', 36'''. In a first position, the top wall 26''' and the portions of side walls 30''', 32''', 34''', 36''' above edge 188 may be opened along hinge 190, thus allowing unobstructed access to the interior space 38''', for thorough cleaning. In a second, closed position, the top wall 26''' is completely closed by the abutting of edges 192 and 188. In a preferred embodiment, the top wall 26''' may be securely fastened in a closed position by using a fastener 194 of the type in FIG. 7.

Figure 9:
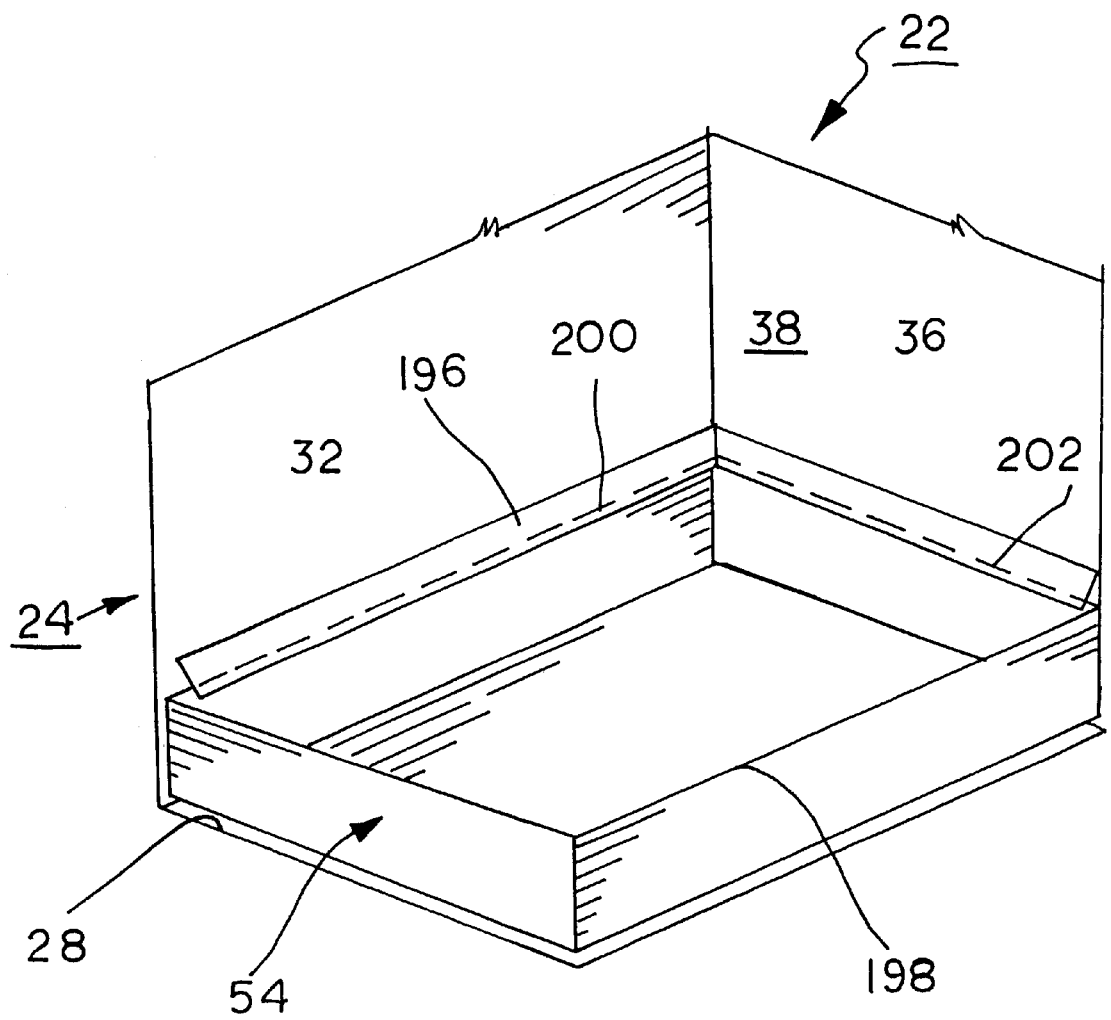
FIG. 9 is a cutaway view of the module according to FIG. 1, showing the inner details.

The animal privacy modules according to the various embodiments of the invention preferably include a litter guard 196, such as shown in FIG. 9 attached to the frame 24 of a module 22 according to FIG. 1. This litter guard 196 may include a strip 196 disposed at a predetermined distance above the bottom wall 28 and attached to the inside of the side walls 30 (not shown), 32 and the back wall 36 of the animal privacy module 22. The litter box 54 slides into the interior 38 of the module 22 such that the upper edges 198, 200, 202 of the litter box 54 fit underneath the litter guards 196 on both side walls 30, 32 and the back wall 36. The litter guard 196 inclines at a downward acute angle such that the dispersion of any litter will fall back into the litter box 54 from whence it came. Thus, when the movement of the animal inside the litter box 54 causes litter to be scattered, any litter that is thrown away from the litter box 52 will fall immediately back into the litter box 54 as opposed to falling between the litter box 54 and the walls 30, 32, 36 onto the floor 28 of the module.

Preferably, the modules of the animal privacy system are all identical to one another. Thus, they can be sold individually or in groups of two or more and tailored to meet the needs any household with cats, regardless of how many.

Stacking the modules reduces the amount of floor space that is used by the litter boxes. Multiple litter boxes will have the same footprint as one litter box. This alleviates the need to devote the floor space of an entire wall for the use of litter boxes.

Additionally, litter boxes that are stacked higher will appeal to the cat's natural curiosity and affinity to high places. Thus, cats will be more likely to use the litter boxes in this animal privacy system.

Another advantage of these animal privacy units is that they reduce the amount of scattered litter and contain the litter that is scattered, thereby easing the task of cleaning the area around the litter boxes. The litter guard and the enclosed frame are designed to keep the litter inside the litter box. However, even if some litter does get out, the lips on the cantilevered platforms may keep the litter from falling to the floor.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

We claim:

1. An animal privacy system comprising:
   a module including
   a stackable frame having at least one wall, said at least one wall defining at least in part an interior space and a first opening to provide access to the interior space;
   a cantilevered platform having a first end attached to said frame adjacent said first opening, and a second, unsupported, free end that extends away from said frame; and
   a fastener attached to said frame and attachable to said frame of another module to limit the movement of the another module relative to the module in the vertical direction with the another module stacked on top of the module.

2. The animal privacy system of claim 1, wherein the stackable frame is a rectangular parallelepiped with opposing top and bottom, right and left, and front and back walls.

3. The animal privacy system of claim 1, wherein the module further includes a liter box disposed in the interior space.

4. The animal privacy system of claim 3, wherein:

the at least one wall defines a second opening to allow the litter box to be inserted into and removed from the interior space; and the frame further includes a selectively positionable door attached to the frame adjacent to the second opening to limit access to the litter box.

5. An animal privacy kit comprising:

a module including a stackable frame having at least one wall, said at least one wall defining at least in part an interior space and a first opening to provide access to the interior space; and a cantilevered platform having a first end attached to said frame adjacent said first opening, and a second, unsupported, free end that extends away from said frame; and a fastener attached to said frame and attachable to a frame of another module to limit the movement of the another module relative to the module in a vertical direction with the another module stacked on top of the module.

6. The animal privacy kit of claim 5, wherein the module further includes a litter box disposed in the interior space.

7. The animal privacy kit of claim 6, wherein:

the at least one wall defines a second opening to allow the litter box to be inserted into and removed from the interior space; and the frame further includes a selectively positionable door attached to the frame adjacent to the second opening to limit access to the litter box.

8. The animal privacy kit of claim 5, wherein the module includes an attachment device attached to the cantilevered platform and adapted to attach a hanging toy to the platform to entice an animal to use the module.

9. The animal privacy kit of claim 5, wherein said frame further comprises a filter compartment capable of holding standard odor absorbing filters.

10. The animal privacy kit of claim 5, wherein said frame further comprises a base and a litter guard defined by a strip attached to the at least one wall of the frame at a predetermined distance from the base of the frame to prevent the dispersion of litter.

11. The animal privacy kit of claim 5, wherein:

the frame of the module includes an L-shaped flange having a first leg attached to the at least one wall and a second leg extending from the first leg;

the first leg of the flange of the module abuttable with a first leg of a flange of another module with the another module stacked on top of the module to define a T-shaped fastener receiving structure; and the fastener comprising a clip having a T-shaped opening to receive the T-shaped structure to secure the module to the another module.

12. The animal privacy kit of claim 5, wherein:

the frame of the module includes a flange attached to the at least one wall, the flange extending away from the frame and having holes therethrough; and the fastener comprises a bolt and a nut, the bolt disposable through the hole, and the nut screwable on to the bolt with the bolt disposed through the hole to limit movement of another module relative to the module in a vertical direction with the another module stacked on top of the module.

13. An animal privacy system comprising:

first and second modules wherein each module includes a stackable frame having at least one wall, said at least one wall defining at least in part an interior space and a first opening to provide access to the interior space; and a cantilevered platform having a first end attached to said frame adjacent said first opening, and a second, unsupported, free end that extends away from said frame; and a fastener attached to the first and second modules to limit the movement of the first and second modules relative to each other in a vertical direction with the second module stacked on top of the first module.

14. The animal privacy system of claim 13, wherein:

the frame of each module includes an L-shaped flange having a first leg attached to the wall and a second leg extending from the first leg, the first leg of the flange of the first module abuttable with a first leg of a flange of the second module with the another module stacked on top of the module to define a T-shaped fastener receiving structure; and the fastener comprising a clip having a T-shaped opening to receive the T-shaped structure to secure the module to the another module.

15. The animal privacy system of claim 13, wherein:

the frame of the module includes a flange attached to the at least one wall, the flange extending away from the frame and having holes therethrough; and the fastener comprises a bolt and a nut, the bolt disposable through the hole, and the nut screwable on to the bolt with the bolt disposed through the hole to limit movement of the first and second module relative to one another in a vertical direction when they are stacked one on top of the other.

16. The animal privacy system of claim 13, wherein the module further includes a litter box disposed in the interior space.

17. The animal privacy system of claim 16, wherein:

the at least one wall defines a second opening to allow the litter box to be inserted into and removed from the interior space; and the frame further includes a selectively positionable door attached to the frame adjacent to the second opening to limit access to the litter box.

18. The animal privacy system of claim 13, wherein the module includes an attachment device attached to the cantilevered platform and adapted to attach a hanging toy to the platform to entice an animal to use the module.

19. The animal privacy system of claim 13, wherein said frame also comprises a filter compartment capable of holding standard odor absorbing filters.

20. The animal privacy system of claim 13, wherein said frame also comprises a bottom wall and a litter guard defined by a strip attached to the at least one wall of the frame at a predetermined distance from the bottom wall to prevent the dispersion of litter.

* * * * *